United States Patent
Schroeder et al.

(10) Patent No.: US 10,277,157 B2
(45) Date of Patent: Apr. 30, 2019

(54) HAND-HELD ELECTRICALLY DRIVEN DOMESTIC APPLIANCE WITH MODE SELECTION

(71) Applicant: DE'LONGHI BRAUN HOUSEHOLD GMBH, Neu-Isenburg (DE)

(72) Inventors: Christian Schroeder, Hanau (DE); Christoph Eissengarthen, Nackenheim (DE); Sabine Buhl-Remmel, Schwalbach am Taunus (DE); Christof Kleemann, Bad Homburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

(21) Appl. No.: 15/756,786

(22) PCT Filed: Sep. 1, 2016

(86) PCT No.: PCT/EP2016/070594
§ 371 (c)(1),
(2) Date: Mar. 1, 2018

(87) PCT Pub. No.: WO2017/037160
PCT Pub. Date: Mar. 9, 2017

(65) Prior Publication Data
US 2018/0269820 A1  Sep. 20, 2018

(30) Foreign Application Priority Data
Sep. 1, 2015  (DE) .......................... 10 2015 216 678

(51) Int. Cl.
*H02P 29/40* (2016.01)
*A47J 43/07* (2006.01)
(Continued)

(52) U.S. Cl.
CPC ............ *H02P 29/40* (2016.02); *A47J 43/044* (2013.01); *A47J 43/0755* (2013.01);
(Continued)

(58) Field of Classification Search
CPC .... H02P 29/40; H02P 6/00; H02P 8/34; A47J 2043/04409; A47J 43/044; A47J 43/0755; A47J 43/082
See application file for complete search history.

(56) References Cited

U.S. PATENT DOCUMENTS 5,347,205 A * 9/1994 Piland .................. A47J 43/085
                                                        318/772
5,845,991 A * 12/1998 Sundquist ............. A47J 43/085
                                                        366/206
(Continued)

FOREIGN PATENT DOCUMENTS

DE     29719596 U1    1/1998
DE     20180402 U1    4/2003
(Continued)

OTHER PUBLICATIONS

English translation of Search Report dated Jul. 30, 2018 in corresponding parallel Russian application No. 2018111403/07.
(Continued)

*Primary Examiner* — Thai T Dinh
(74) *Attorney, Agent, or Firm* — Scott R. Cox (57) ABSTRACT

The invention relates to a hand-held electrically driven domestic appliance and to a corresponding method for controlling the hand-held electrically driven domestic appliance. The domestic appliance includes an electric motor for driving the domestic appliance; a control unit for controlling the motor; a first actuation element for outputting a first control signal to the control unit in order to select a motor control mode; and a second actuation element for outputting
(Continued)

a second control signal to the control unit. The control unit is designed to select a motor actuation mode from the specified motor actuation modes on the basis of the first control signal, and the control unit is designed to determine a motor actuation signal to be output to the motor on the basis of the selected motor actuation mode and the second control signal.

12 Claims, 8 Drawing Sheets

(51) Int. Cl.
*H02P 6/00* (2016.01)
*A47J 43/044* (2006.01)
*A47J 43/08* (2006.01)

(52) U.S. Cl.
CPC .............. *A47J 43/082* (2013.01); *H02P 6/00* (2013.01); *A47J 2043/04409* (2013.01)

(56) References Cited

U.S. PATENT DOCUMENTS

| | | | |
|---|---|---|---|
| 5,889,922 A | 3/1999 | Bufe et al. | |
| 6,172,472 B1 | 1/2001 | Klingbeil | |
| 6,609,821 B2 * | 8/2003 | Wulf | A47J 43/042 318/256 |
| 8,716,968 B2 * | 5/2014 | Larson | A47J 43/0716 318/254.1 |
| 8,899,824 B2 * | 12/2014 | Kolar | A47J 43/07 366/206 |
| 10,070,756 B2 | 9/2018 | Planegger et al. | |
| 2013/0214716 A1 | 8/2013 | Barfus et al. | |
| 2014/0226436 A1 | 8/2014 | Baker | |

FOREIGN PATENT DOCUMENTS

| | | |
|---|---|---|
| DE | 102008040935 A1 | 2/2010 |
| RU | 2 492 791 C2 | 9/2013 |
| WO | WO2013038360 A1 | 3/2013 |

OTHER PUBLICATIONS

English translation of Decision to Grant dated Aug. 31, 2018 in corresponding parallel Russian application No. 2018111403/07.
International Search Report with Written Opinion of the International Searching Authority, dated Dec. 15, 2017, with respect to International Application No. PCT/EP2016/070594.
International Preliminary Report on Patentability of the International Searching Authority, dated Jan. 4, 2018, with respect to International Application No. PCT/EP2016/070594.

* cited by examiner

Fig. 8

HAND-HELD ELECTRICALLY DRIVEN DOMESTIC APPLIANCE WITH MODE SELECTION

TECHNICAL FIELD

The present invention relates to a hand-held electrical domestic appliance.

BACKGROUND TO THE INVENTION

Figure 8:
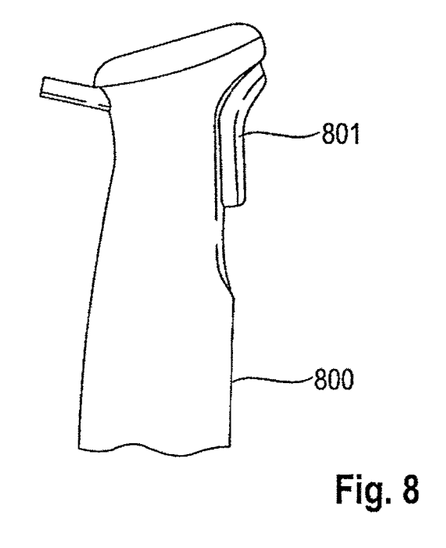
FIG. 8: an illustration of a portion of the hand blender from the prior art.

Hand-held electrically driven domestic appliances, such as hand blenders, are used nowadays in many homes and kitchens. This type of hand blender, such as the hand blender described in EP 2 571 037 A1, generally has a speed switch for smoothly controlling the speed of the motor which drives the hand blender. By means of the speed switch or controller, in the following generally referred to as the operation element, the speed or the rotation speed of the motor can be adjusted from complete standstill to a maximum rotation speed of the motor. The adjustment is made according to the movement path or the operation path, such as the depth of pushing in the speed switch, or the force applied to the speed switch, mostly smoothly or continuously. A portion of the prior art hand blender is shown in FIG. 8, reference number 801 depicting the speed switch of the hand blender 800.

This type of hand-held electrically driven domestic appliance, such as the prior art hand blender, has a problem, namely that the operation path (e.g. the depth of pushing in) of the speed switch is relatively small, but nevertheless a large rotation speed range of the motor from zero to maximum speed must be able to be actuated/controlled. This makes it difficult for the user of the appliance to select and hold a specific control, such as a specific speed, which is preferred by the user or which is ideal for a specific application or process.

Another problem associated with conventional hand-held electrically driven domestic appliances, such as hand blenders, is that the speed may change with a constant position of the operation element (e.g. a constant depth of pressing in) due to a change in the load as a result of the product to be processed (such as the food that is to be broken up), and this may lead to an undesirable processing result. This type of load change may be brought about e.g. when processing pasty, sticky foods that form balls such as dough, honey, thick soups as well as with food processor applications where food is fed in non-uniformly (e.g. cutting slices, grating, juice extraction, mincing), with which a required start-up torque is very high and the required torque then decreases greatly.

OBJECT OF THE INVENTION

It is therefore desirable to provide an improved hand-held electrically driven domestic appliance which resolves at least one of the aforementioned problems and leads to improved control or driving of the hand-held electrically driven domestic appliance or its motor.

Solution to the Object

One solution to this object is provided by the hand-held electrically driven domestic appliance that has the features given in claim 1.

This hand-held electrically driven domestic appliance comprises an electric motor for driving the domestic appliance, a control unit for controlling the motor, a first operation element for outputting a first control signal to the control unit in order to select a motor control mode, a second operation element for outputting a second control signal to the control unit, the control unit being adapted to select a motor actuation mode from specified motor actuation modes on the basis of the first control signal, and the control unit being adapted to determine a motor actuation signal to be outputted to the motor on the basis of the selected motor actuation mode and the second control signal.

Thus, the motor can be actuated or driven by the motor actuation signal, such as the voltage to be applied, the torque or the rotation speed to be used depending on the selection of a specific motor actuation mode.

By providing different motor actuation modes, it is made possible here to control the rotation speed or the voltage to be applied to the motor more precisely depending on the requirements of the user.

The motor actuation modes define here e.g. different courses or actuation profiles or relationships between the operation path of the second operation element and an actuation or driving value (such as a voltage to be outputted or a rotation speed of the motor or a rotation speed of an axis associated with the blades of the hand blender) or also different maximum actuation values and/or minimum actuation values.

A motor actuation mode with a corresponding actuation profile, which is most suitable for the respective working process, or e.g. for the respective food to be processed, can therefore be selected by the user, and this makes more precise actuation or control of the motor possible.

Accordingly, by means of the hand-held electrically driven domestic appliance a more precise actuation or control is made possible by means of the second operation element by selecting a corresponding motor actuation mode. On the one hand this facilitates the usage, and on the other hand leads to an improved processing result.

A corresponding method for controlling a hand-held electrically driven domestic appliance comprises the steps of receiving a first control signal in order to select a motor control mode from a first operation element; receiving a second control signal from a second operation element; selecting a motor actuation mode from specified motor actuation modes on the basis of the first control signal; determining a motor actuation signal to be outputted to an electric motor on the basis of the selected motor actuation mode and the second control signal.

Further Development and Advantages Thereof

Preferably, the second control signal outputted by the second operation element is dependent upon an operation path of the second operation element.

This makes it possible to output a signal according to the operation path, and thus e.g. according to the depth of pushing in or according to the force exerted by the second operation element. The operation path or the corresponding signal can on the one hand be continuous or stepless, or on the other hand have multiple steps (preferably more than two steps).

Preferably, the specified motor actuation modes also comprise at least one of: a first motor actuation mode with a first maximum actuation value for actuating the electric motor, the control unit being adapted to determine the motor actuation signal to be outputted to the motor on the basis of the second control signal and the first maximum actuation value; a second motor actuation mode with a second maximum actuation value for actuating the electric motor, different from the first maximum actuation value, the control unit being adapted to determine the motor actuation signal to be outputted to the motor on the basis of the second control signal and the second maximum actuation value; and/or a first pulse mode with a first pulse form of the actuation signal for actuating the electric motor, the control unit being adapted to determine the motor actuation signal to be outputted to the motor on the basis of the second control signal and the first pulse form.

With the provision of one or more of the actuation modes specified above, preferably two or more, the control by the user is further improved. Here e.g. a first and a second actuation mode can be provided which respectively differ as regards the maximum value of the actuation value (maximum actuation value). The maximum value here can be e.g. a maximum value of a voltage to be applied, a maximum value of a torque or a maximum value of a rotation speed of the motor (or of an axis of the motor). Consequently, this type of mode can be adapted for low rotation speeds, e.g. by choosing a low maximum value, in order to enable slow breaking up or crushing with at the same time high precision of the rotation speed selection because the operation path of the second operation element must be represented on a smaller value range of the actuation value. The provision of a pulse mode (or of a number of different pulse modes) brings further advantages in the processing of certain foods (e.g. more uniform grinding) and enables a further improvement of the processing result. The present pulse programmes and pulse forms can therefore also have a non-constant course or progression over time and differ from constant curve progressions with a defined maximum power.

Also preferably, the maximum actuation value is a maximum voltage to be applied, a maximum torque or a maximum rotation speed of the motor.

The selected maximum value can accordingly relate to the voltage to be applied, the torque or the rotation speed. When selecting the maximum value as a specific maximum rotation speed, the actuation or control of the motor is further improved, even if there is a change e.g. in the consistency of the product to be worked, since a specific maximum rotation speed is not exceeded with a change in load. The same applies accordingly to other foods when using a maximum torque or the voltage to be applied.

Also preferably, the control unit is adapted, in the pulse mode, to control the pulse width dependently upon the operation path of the second operation element, to switch between an off state and actuation with the pulse form according to the actuation of the second operation element, to control an amplitude of the pulse form dependently upon the operation path of the second operation element, to control a frequency of the pulse form dependently upon the operation path of the second operation element, to control the pulse ratio, on/off, of the pulse form dependently upon the operation path of the second operation element; or to control a combination thereof according to the operation path.

By actuating an appropriate parameter for the processing, the processing result can be further improved depending on the food to be processed.

Also preferably, the pulse form of the pulse mode is one of a saw tooth pulse (optionally with different rates of increase, gradients), a sinusoidal pulse, a rectangular pulse, a trapezoidal pulse or any pulse form.

According to the chosen food or the desired processing result, the various pulse forms offer improved results of the processing of the product being processed.

Also preferably, in the first and the second motor actuation mode there is a correlation between the second control signal and an actuation value between a minimum value and the first or second maximum value of one of: a linear correlation; an exponential correlation; a step-like correlation; any curved correlation.

In order to enable good actuation of an actuation voltage range, optionally at the same time enabling utilisation of the complete actuation range, different courses of the actuation, and so different correlations between the second control signal and an actuation value between the minimum and the maximum actuation value of the respective mode are selected.

Also preferably, the domestic appliance comprises a measuring device for measuring the rotation speed of the motor, the control unit being adapted to determine the motor actuation signal to be outputted to the motor, also on the basis of the rotation speed measured for the motor.

This enables control or regulation of the motor by means of the rotation speed of the motor or e.g. by means of the rotation speed of the axis connected to the blades of the hand blender and so prevention of fluctuations due to the load change which is brought about e.g. by changing the consistency of the product or of the food to be processed.

At the same time more precise actuation of the motor by the user is enabled since a specific control signal or a specific value of the control signal, and so a specific operation path of the second operation element is associated with a specific rotation speed so that a specific rotation speed can be selectively actuated.

Preferably, a corresponding method also comprises the step: measuring, by means of a measuring device, the rotation speed of the motor, in the step of determining the motor actuation signal to be outputted to the motor also being determined on the basis of the measured rotation speed of the motor.

BASIC PRINCIPLE OF THE INVENTION

Figure 1:
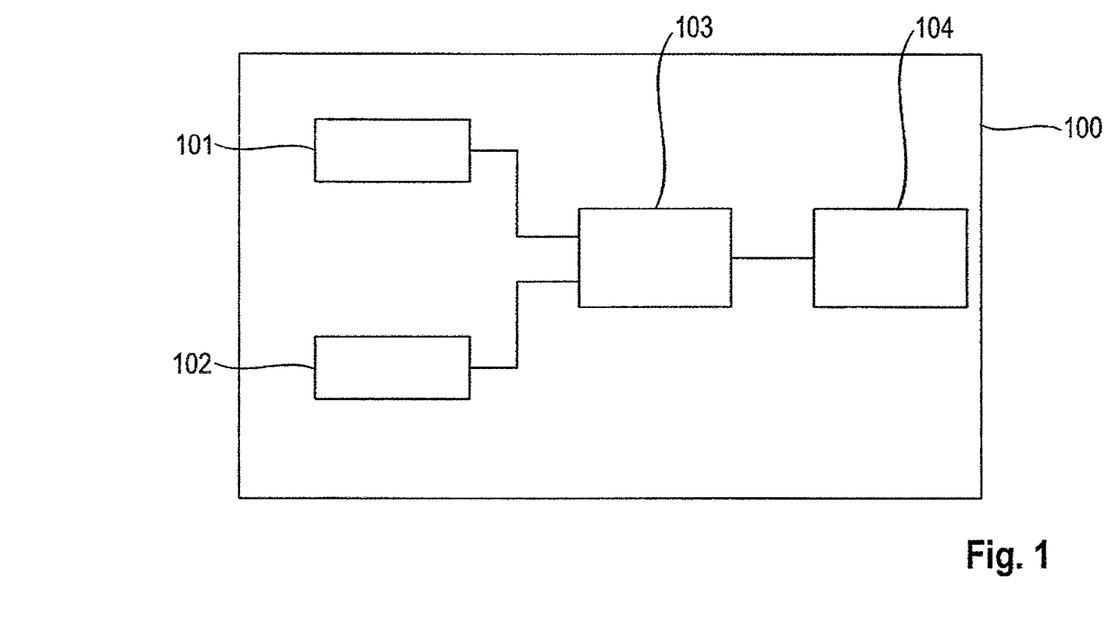
FIG. 1: the general principle of the hand-held electrically driven domestic appliance according to the invention.

FIG. 1 shows the basic principle of the invention. With reference to this figure, the basic principle will be explained in more detail below.

A hand-held electronically driven domestic appliance 100, such as a hand blender, comprises a first operation element 101, a second operation element 102, a control unit 103 and a motor 104. The first operation element 101 serves to output a first control signal in order to select a motor control mode. A button or a switch with a number of positions for the selection of a number of modes, for example, can be used as this type of first control element. A possible embodiment of the first operation element 701 can be seen in FIG. 7.

A control signal in the form of an output signal of the first operation element is outputted to the control unit 103 which carries out a corresponding control or regulation, as will be described later.

The second operation element, which outputs a second control signal, may be in the form e.g. of a button which outputs a signal according to the operation path or the movement path of the button. Here, the operation path or the movement path can be e.g. the depth of pushing in the button or the force exerted upon the button. Furthermore, the operation path can also be e.g. the incline or the angular position of the operation element or also the path of displacement of a slider switch. This type of signal, which is dependent upon the operation path, can be adapted to be continuous or alternatively stepwise, this stepwise form preferably having more than twosteps. Also preferably, the operation path of the button can be adapted continuously and alternatively also without steps, and a signal corresponding to the operation path can be outputted.

Figure 7:
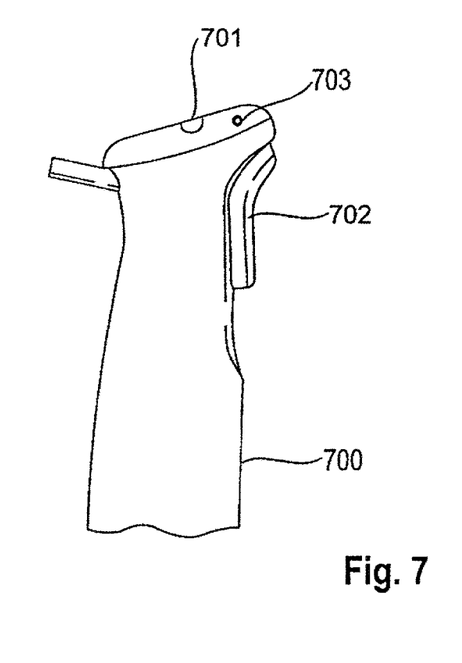
FIG. 7: an illustration of a portion of the hand blender according to the invention.

One possible embodiment of the second operation element 702 can be seen in FIG. 7.

The control unit 103 receives the control signals of the first and the second operation element and uses these to determine a motor actuation signal to be outputted to the motor. For this purpose, a motor control mode is first of all selected from a plurality of different motor actuation modes by means of the control signal outputted by the first operation element. Such a selection can take place e.g. on the one hand by pressing the first operation element a number of times until the desired motor control mode is reached or according to the selected position of a slider switch.

The outputting of a currently selected mode to the user can take place by means of a notification (not shown in FIG. 1), e.g. in the form of a display, of an acoustic signal or of one or more LEDs. One possible embodiment as individual LEDs 703 can be seen in FIG. 7. The selected mode can be represented here e.g. by multiple flashing of the LEDs according to the number of the selected mode or also different colours.

Every motor actuation mode here has a different correlation or a different representation or association of the second control signal (or of its value) to or with an actuation value.

These motor control modes may differ here for example in the profile or profile progression of the representation of the second control signal (or of its value) on an actuation value or also in another minimum or maximum actuation value.

If a corresponding motor actuation mode has been selected from a plurality of motor actuation modes by means of the first operation element, a determination is made by means of this motor actuation mode and of the control signal received from the second operation element.

An actuation value is determined here by means of the operation path (or operation path position) indicated by the control signal and of the selected motor control mode which establishes a correlation between the operation path and an actuation value for actuating or controlling the motor 104 (actuation value).

Determination of the motor actuation signal to be outputted to the motor now takes place by means of the actuation value determined by the selected motor actuation mode and the operation path. Here the control unit determines a signal which is to be applied to the motor in order to achieve the desired actuation value or which leads to control or regulation of the motor corresponding to the desired actuation value.

In other words, a motor actuation signal is determined by the motor working according to the specific actuation value.

An actuation value is to be understood here to mean e.g. one of a rotation speed, a torque, a voltage to be applied to the motor, or a power. Other actuation values or actuation parameters which can be applied accordingly are known to the person skilled in the art.

The motor actuation signal can in turn be e.g. the voltage to be applied to the motor. However, a motor actuation signal is not restricted to this, and this may also be a control signal for a phase section control, control of the current, the frequency, the excitation field strength, the field frequency etc. In this connection the person skilled in the art knows various possibilities for actuating a motor in order to achieve a desired actuation value (e.g. a desired rotation speed) by appropriately actuating the motor (e.g. by applying an appropriate voltage, phase section control, control of the current, the frequency, the excitation field strength, the field frequency etc.).

The corresponding motor actuation signal is outputted to the motor of the hand-held electrically driven domestic appliance or to a unit provided for controlling the voltage.

In this type of motor actuation mode the motor is actuated by the control unit such that the motor works according to the actuation signal.

The profiles to be used and a detailed description of possible actuation modes and their embodiment are explained in more detail below.

By selecting an actuation mode from a number of actuation modes, precise and reliable control or regulation of the motor or of the motor actuation signal is made possible despite the small operation path or movement path of the second operation element.

EMBODIMENTS OF THE INVENTION

Preferred embodiments of the present invention are described in detail below with reference to the accompanying drawings. Here, identical or corresponding components are identified with respectively identical or similar reference numbers in the various drawings.

Figure 2:
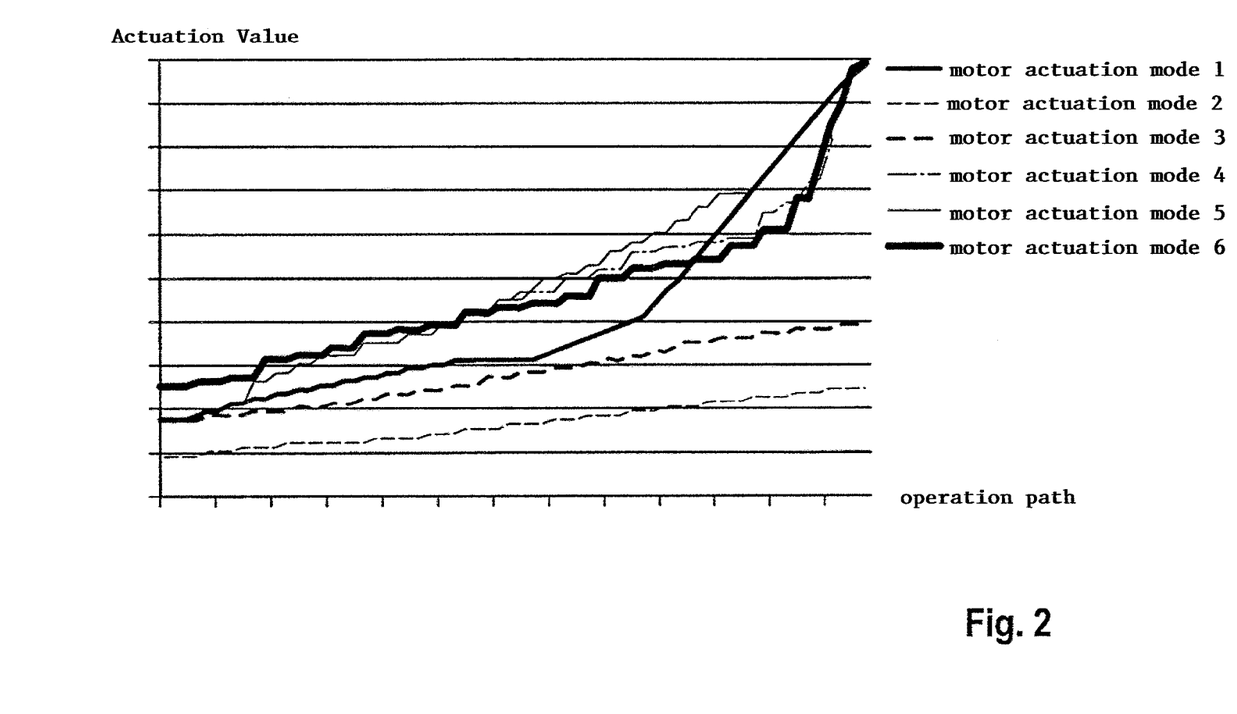
FIG. 2: possible courses of the actuation for various actuation modes.

FIG. 2 shows here by way of example various courses or progressions of possible motor actuation modes. The operation path is plotted on the X axis. The actuation value is plotted on the Y axis. Both axes are shown without a unit. As already mentioned, the operation path on the X axis may represent e.g. the depth of pushing in or the force exerted in an appropriate unit or as a percentage of a maximum value. The same applies to the actuation value plotted on the Y axis. This can also be plotted in an appropriate unit or as a percentage of a maximum value.

As can be gathered by way of example from the diagram of FIG. 2, the motor actuation modes differ e.g. in the associated maximum value of an actuation value (maximum actuation value) for the actuation and control of the motor. As stated above, the associated maximum value of the actuation value may on the one hand be a maximum rotation speed here or a maximum speed of the motor or of the associated axis or a maximum torque. On the other hand, the maximum value may also represent a specific maximum voltage which is to be applied to the motor, or some other actuation value such as a maximum power, a maximum current or similar. The maximum actuation values may be defined here in an appropriate unit or as a percentage of a reference value. In this connection, in a second mode, which follows a first mode with 100%, the maximum actuation value may also be at a reduced maximum rotation speed of 10%-90%, preferably 30%-70% and more preferably 40%-60% of the maximum rotation speed. Thus, the rotation speed can be adjusted better over a large actuation range.

As can also be seen, the various motor actuation modes may however also differ in their minimum value, a first motor actuation mode having a minimum value which is different from the minimum value of a second motor actuation mode.

Furthermore, the course or progression of the correlation between the operation path, such as the depth of pushing in the button or the force exerted upon the second operation element, and a corresponding value between the minimum value and the maximum value (actuation value), and so the course or the profile between the minimum value and the maximum value between the respective motor actuation modes can be configured differently.

The course of the motor actuation mode identified as 2 in FIG. 2 is therefore e.g. approximately linear. In this connection approximately linear can also include a form insteps, as can be seen in one embodiment, an approximation of which constitutes a straight line. Other profile courses, such as an approximately exponential course, as partially in the motor actuation mode 1, is a possible embodiment of this type of profile course of a motor actuation mode. Combinations between linear courses and exponential courses or similar, as shown as motor actuation mode 1, may also be formed.

Thus, different assignments and associations of the second control signal or its values arise with the possible actuation values, depending on the profile course.

Further possible actuation modes in the form of one or more (differently formed) pulse modes will now be described with reference to FIG. 3.

In one pulse mode the (desired) actuation value has a pulse-shaped course over time. Accordingly, the motor is actuated by the control unit such that the motor works according to the actuation value that changes in pulse form over time, and also has a pulse-shaped course over time.

In this connection one or more motor actuation modes may be in the form of pulse modes.

Figure 3:
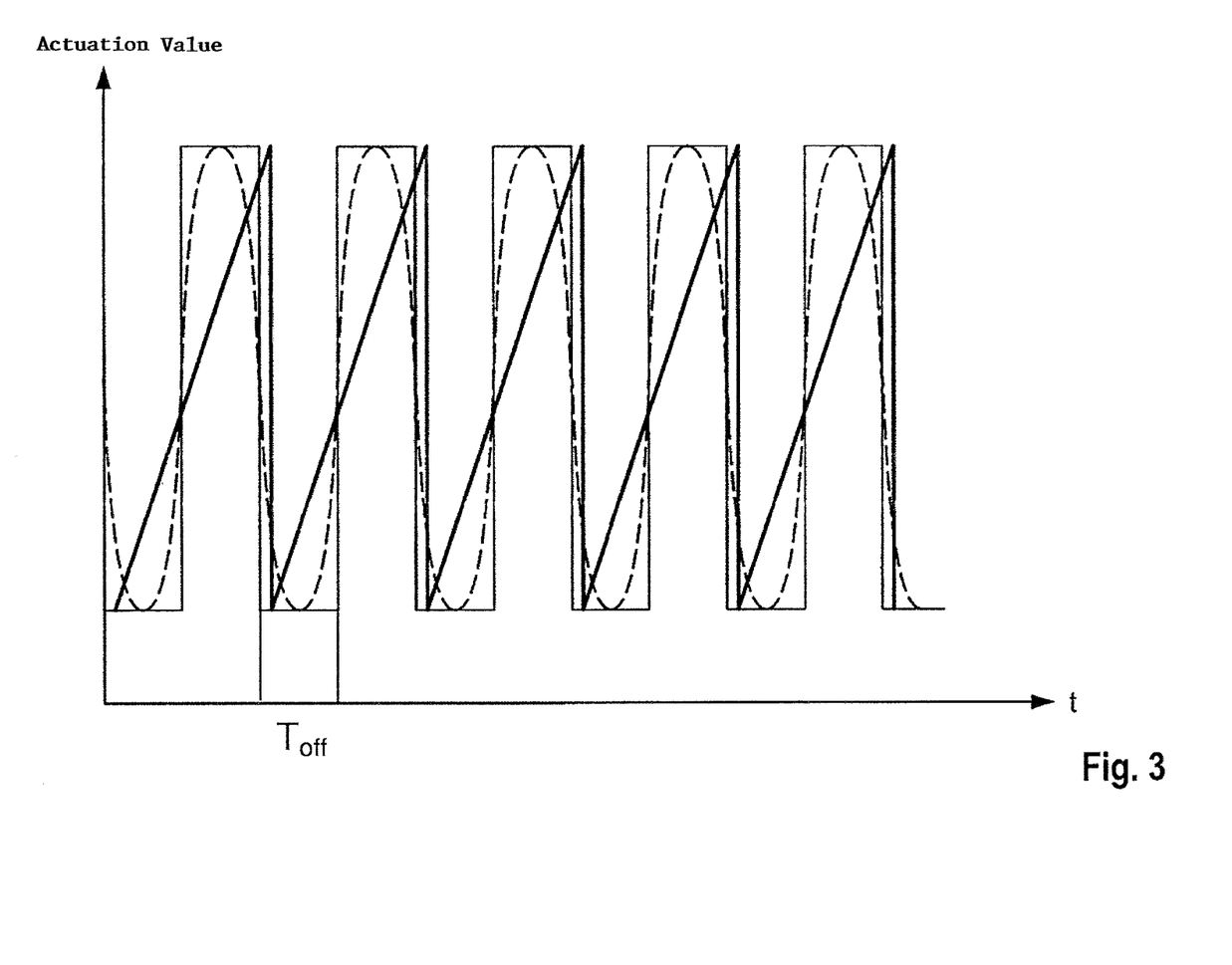
FIG. 3: possible courses of the actuation for pulse modes.

As can be gathered, for example, from FIG. 3, this type of course of the actuation value of the motor actuation or control can be a rectangular course or form (rectangular pulse), a saw tooth course (saw tooth pulse), a sinusoidal course (sinusoidal pulse), a trapezoidal course (trapezoidal pulse) or some other pulse form. Here, very long pause times Toff (OFF time) in the region of 50 ms-2 s, preferably 100 ms-1 s, and for example 500 ms, are preferably used for a hand-held electrical domestic appliance, and this differs substantially from a normal PWM actuation since the motor can come to a standstill here. Furthermore, the ON time (Ton) may differ from the pause time Toff, and the respective interval times (Ton, Toff) can be set by the operation element. In comparison to actuation when using the maximum power of 100%, in this case, with a final value of the maximum power/voltage of, for example, 50-60%, a smaller rotation speed range can be covered by a complete mechanical operation path, and this leads to better adjustability of the power/rotation speed.

Accordingly, e.g. when using a rectangular course or a rectangular form, the actuation value changes cyclically between a first actuation value and a second actuation value.

The use of this type of pulse form is advantageous for the processing of certain products to be processed. Thus, the use of a pulse form is advantageous e.g. for hard foods, such as nuts, in order to achieve a uniform processing result. A non-constant pulse course which, as described above, may be, for example, rectangular or in the form of saw teeth etc., leads to an enormous improvement in the cutting result.

Figure 4:
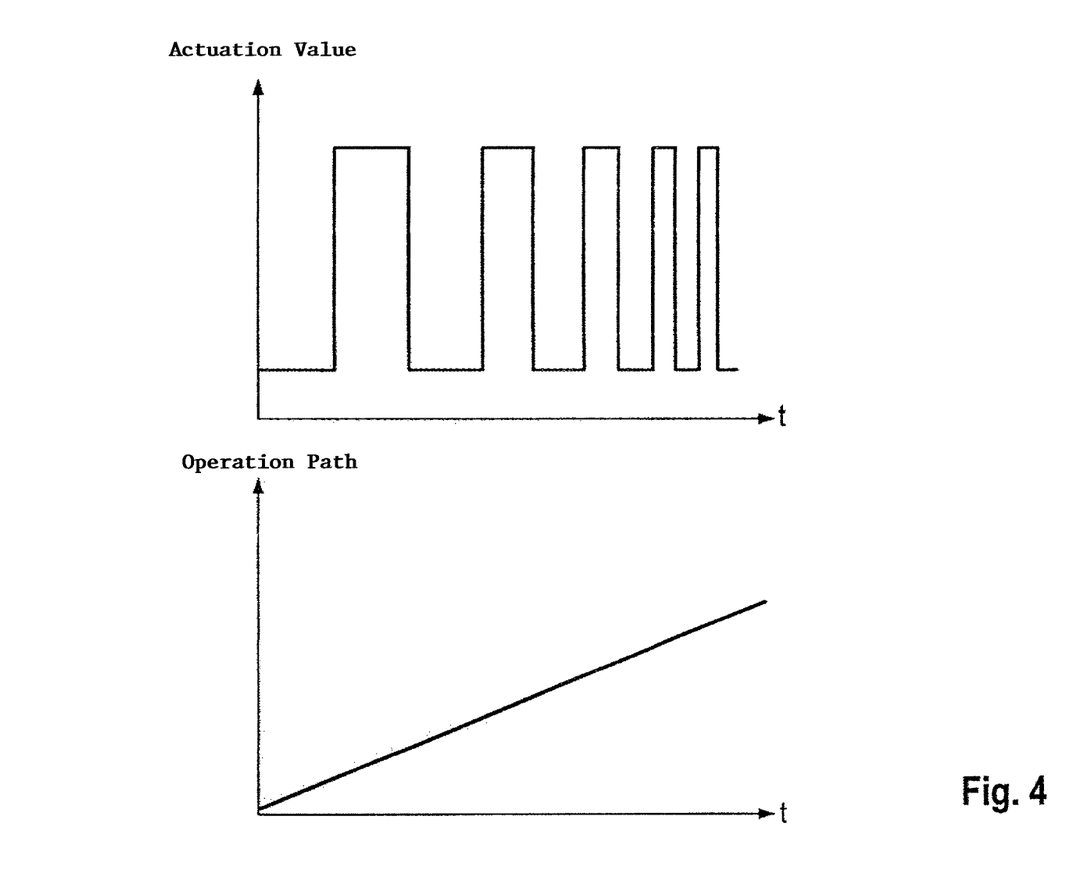
FIG. 4: a correlation of the operation path to the pulse width in an actuation mode.

Possible methods for controlling the pulse modes will now be described with regard to FIGS. 4 and 5. In a first embodiment, when selecting a pulse mode (possibly from a number of possible pulse modes), the motor can be switched on or off by operating the second operation element. Therefore, the second operation element serves purely to switch the motor on and off, the parameters of the pulse mode such as amplitude, frequency and the like being independent of the operation path of the second operation element.

In another example the frequency and the pulse width of the pulse can be controlled via the operation path of the second operation element. As can be gathered from FIG. 4, by raising the operation path or its value, the pulse width is accordingly reduced or the frequency of the pulse is raised. Thus, the actuation value changes as the speed increases from a first value to a second value and vice versa.

This makes it possible for the user to set the actuation value, such as the breaking up or crushing speed via the second operation element with only one operation element while at the same time maintaining the pulse mode.

Figure 5:
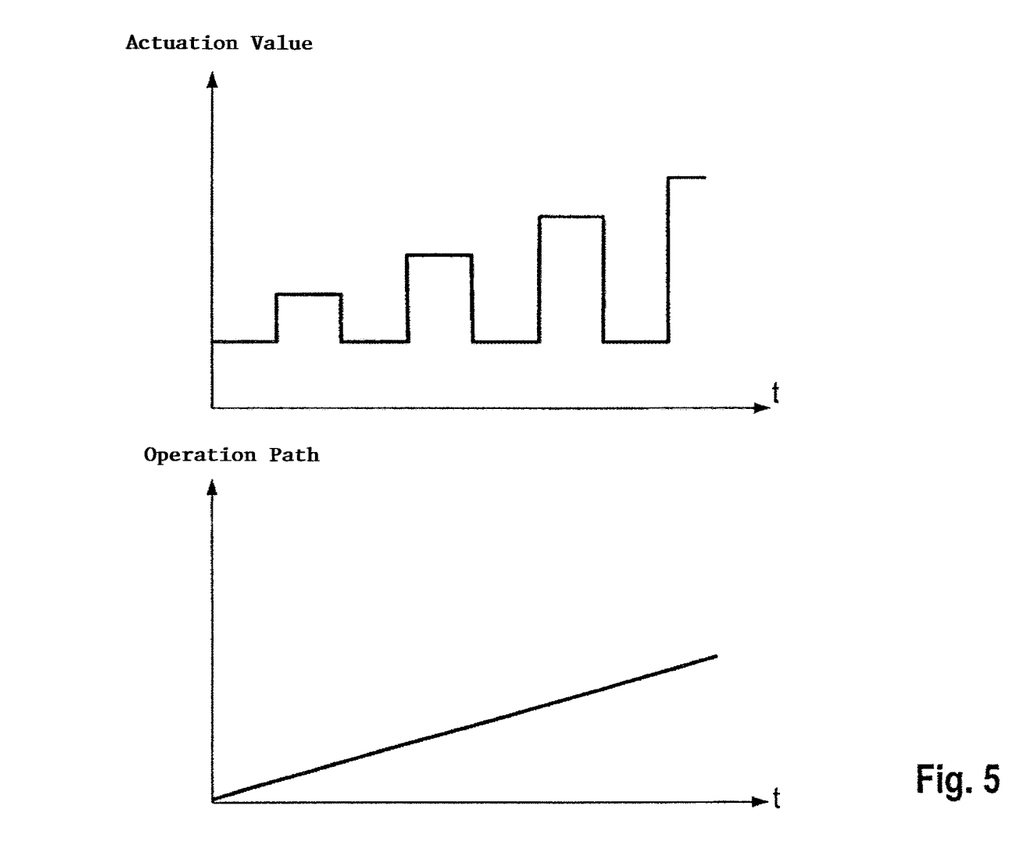
FIG. 5: a correlation of the operation path to the amplitude in an actuation mode.

In another example, as shown in FIG. 5, the second operation element can be used to control the amplitude. FIG. 5 shows, for example, a pulse mode in which the maximum actuation value of the pulse mode is increased by raising the operation path or its value. However, this control method is not restricted to this, and the pulse amplitude can also be changed by adapting the upper and the lower value of the pulse.

It is obvious to the person skilled in the art that the form of the pulse modes is not restricted to the change of amplitude, pulse width or frequency, but control/regulation of an on/off duty cycle and any combination of the aforementioned controls depending upon the second control signal is possible.

Figure 6:
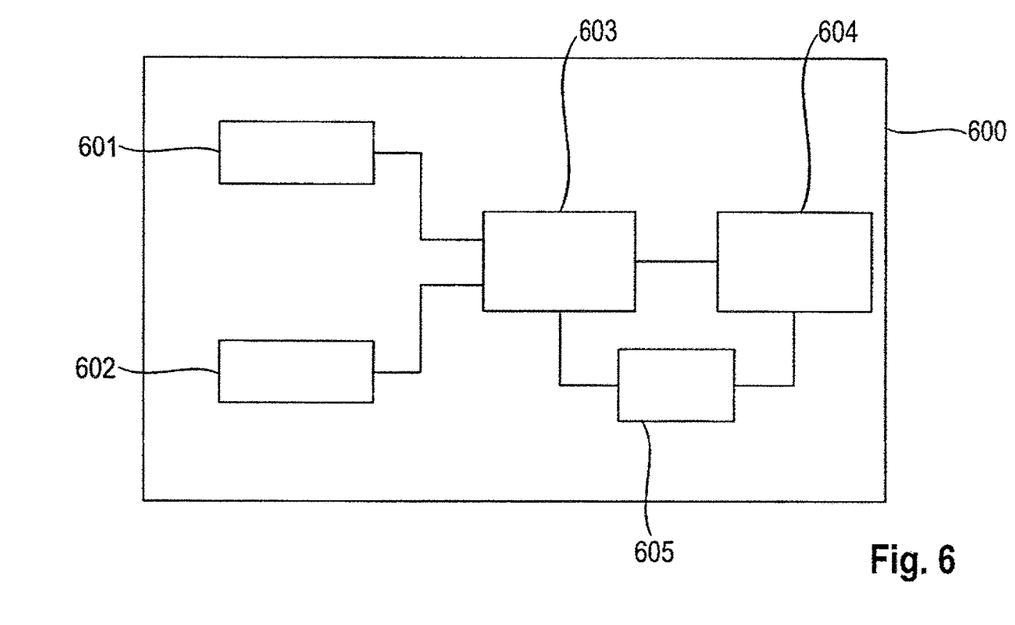
FIG. 6: another embodiment of the hand-held electrically driven domestic appliance according to the invention.

The second embodiment of the present invention will now be described below with reference to FIG. 6. According to the first embodiment the hand-held electrically driven domestic appliance 600 of the second embodiment comprises a first operation element 601, a second operation element 602, a control unit 603 and a motor 604. The second embodiment of FIG. 6 differs from the embodiment of FIG. 1 in that it also has a measuring device 605 for measuring the rotation speed of the motor.

The measuring device 605 is adapted to measure the rotation speed of the motor. The measurement of the rotation speed of the motor also includes the measurement of the rotation speed of an adjoining axis such as for the connection of the blades of the hand blender to the motor. A signal of the measuring device 605 is inputted into the control unit 603.

By means of the rotation speed measured by the measuring device, the actuation or control of the motor can be further improved.

If e.g. a sticky food such as dough, honey or thick soups is being processed, the start-up torque of the motor is very high and so a high voltage must be set in order to enable a start-up of the appliance. However, the required torque decreases abruptly, and this leads to a strong rise in the rotation speed if the operation path of the second operation element is maintained. In the case of sticky foods it is almost impossible for the user to adapt the operation path of the second operation element correspondingly quickly in order to obtain a constant rotation speed. This is particularly disadvantageous if a low rotation speed is required to process the food because the abruptly rising rotation speed leads to the optimal rotation speed being exceeded, and the processing result is worsened.

This problem is resolved by providing the measuring device 605 because regulation of the (measured) actual rotation speed to a desired (target rotation speed) can take place.

The actuation values shown in FIGS. 2 to 5, as well as the minimum and maximum values, are (target) rotation speeds in this embodiment. The diagrams and the corresponding actuation modes accordingly reflect a correlation between the operation path of the second operation element and a target rotation speed.

After determining the desired target rotation speed as an actuation value via the selected mode and the operation path of the second operation element, this specific target rotation speed (actuation value) is compared with the current actual rotation speed which is outputted by the measuring device. The control unit undertakes an appropriate regulation of the voltage to be outputted in order to match the actual rotation speed to the target rotation speed.

Accordingly, if the actual rotation speed is too low, the motor actuation signal to be outputted to the motor is selected such that the motor rotation speed increases. For example, the voltage to be applied to the motor may be determined to be higher than the currently applied voltage, and the motor can be actuated accordingly or an appropriate voltage can be applied to the motor.

By means of this control circuit the actual rotation speed is constantly checked against the target rotation speed in order to match the actual rotation speed to the target rotation speed.

Consequently, by changing the rotation speed by changing the load on the blades of the hand blender e.g. by breaking down the product to be broken down, an increase in rotation speed is prevented because, by means of the control circuit, constant checking of the actual rotation speed and readjustment of the motor actuation signal to be outputted to the motor takes place.

Accordingly, by providing a measuring device in the second embodiment, the actuation and control of the motor and the processing result that is achieved in this way is further improved, and a constant motor speed is also achieved by changing the load.

In the present embodiments the control unit has been described such that it determines and outputs a motor actuation signal.

In this connection, the outputting of a motor actuation signal to the motor also includes the outputting of an appropriate control signal to additional components lying in between, such as a switching device, such as a Triac, Mosfet, IGBT or transistor, which serves to output the required power or voltage to the motor.

The person skilled in the art is therefore familiar with a wide range of possibilities for forming the motor actuation signal, such as a control signal or also as voltage to be applied to the motor.

As is also evident to the person skilled in the art, the control signal of the second actuation device can either be an analogue or a digital signal which is processed by the control unit.

The person skilled in the art is familiar with various types of embodiment of the second actuation device which outputs an analogue or digital signal corresponding to an operation path or a position along an operation path, a depth of pushing in a button, a displacement path of a slider switch or a compressive force upon the operation element.

The control unit may be in the form of e.g. a microcontroller.

Any combination of the features specified in the claims is also included.

The hand-held electrically driven domestic appliance is not restricted to the aforementioned hand blender, but may also include e.g. other hand-held kitchen appliances such as a hand mixer.

It is evident to the person skilled in the art from the preceding description that various modifications and variations of the hand-held electrically driven domestic appliance can be implemented without straying from the scope of the invention.

Furthermore, the invention has been described with reference to specific examples which only serve, however, to give a better understanding of the invention and are not intended to restrict the latter. It is also immediately evident to the person skilled in the art that many different combinations of hardware, software and firmware can be used to implement the present invention, in particular in order to realise the function of the control unit.

COMMERCIAL APPLICABILITY

The hand-held electrically driven domestic appliance, such as a hand blender, can be used to process foods.

The invention claimed is:
1. A hand-held electrically driven domestic appliance comprising:
an electric motor for driving the domestic appliance;
a control unit for controlling the motor;
a first operation element for outputting a first control signal to the control unit to select a motor control mode; and
a second operation element for outputting a second control signal to the control unit,
wherein the control unit selects a motor actuation mode from specified motor actuation modes on the basis of the first control signal,
wherein the control unit determines a motor actuation signal to be outputted to the electric motor on the basis of the selected motor actuation mode and the second control signal,
wherein the second control signal outputted by the second operation element utilizes an operation path of the second operation element,
wherein the specified motor actuation modes is selected from the group consisting of:
a first motor actuation mode with a first maximum actuation value for actuating the electric motor, wherein the control unit determines the motor actuation signal to be outputted to the electric motor on the basis of the second control signal and the first maximum actuation value;
a second motor actuation mode with a second maximum actuation value for actuating the electric motor different from the first maximum actuation value, wherein the control unit determines the motor actuation signal to be outputted to the electric motor on the basis of the second control signal and the second maximum actuation value; and
a first pulse mode with a first pulse form of the actuation signal for actuating the electric motor, wherein the control unit determines the motor actua- tion signal to be outputted to the electric motor on the basis of the second control signal and the first pulse form.

2. The hand-held electrically driven domestic appliance according to claim 1, wherein
the first and second maximum actuation values are selected from the group consisting of a maximum voltage to be applied to the electric motor, a maximum torque of the electric motor and a maximum rotation speed of the electric motor.

3. The hand-held electrically driven domestic appliance according to claim 1, wherein
the control unit selects the first pulse mode, and performs at least one of the following functions:
to control a pulse width dependently upon an operation path of the second operation element;
to switch between an off state and actuation with the first pulse form according to an actuation of the second operation element;
to control an amplitude of the first pulse form dependently upon the operation path of the second operation element;
to control a frequency of the first pulse form dependently upon the operation path of the second operation element;
to control a pulse ratio, and on/off, of the first pulse form dependently upon the actuation path of the second operation element; or
to control a combination thereof according to the operation path of the second operation element.

4. The hand-held electrically driven domestic appliance according to claim 1, wherein
the first pulse form of the first pulse mode is selected from the group consisting of:
a sawtooth pulse;
a sinusoidal pulse;
a rectangular pulse;
a trapezoidal pulse; and
any pulse form.

5. The hand-held electrically driven domestic appliance according to claim 1, wherein
in the first and the second motor actuation mode, a correlation exists between the second control signal and an actuation value between a minimum value and the first or second maximum value, wherein the correlation is selected from the group consisting of:
a linear correlation;
an exponential correlation;
a step-like correlation; and
any curved correlation.

6. The hand-held electrically driven household appliance according to claim 1, further comprising:
a measuring device for measuring a rotation speed of the electric motor, wherein
the control unit further determines the motor actuation signal to be outputted to the electric motor, on the basis of the rotation speed measured for the electric motor.

7. A method for controlling a hand-held electrically driven domestic appliance comprising the steps:
receiving a first control signal to select a motor control mode from a first operation element;
receiving a second control signal from a second operation element;
selecting a motor actuation mode from specified motor actuation modes on the basis of the first control signal; and
determining a motor actuation signal to be outputted to an electric motor of the appliance on the basis of the selected motor actuation mode and the second control signal,
wherein the received second control signal from the second operation element utilizes an operation path of the second operation element,
wherein the specified motor actuation modes comprise a mode selected from the group consisting of:
a first motor actuation mode with a first maximum actuation value for actuating the electric motor, wherein the motor actuation signal to be outputted to the electric motor being determined on the basis of the second control signal and the first maximum actuation value in the step of determining a motor actuation signal to be outputted to the electric motor of the appliance;
a second motor actuation mode with a second maximum actuation value different from the first maximum actuation value, for actuating the electric motor, wherein the motor actuation signal to be outputted to the motor being determined on the basis of the second control signal and the second maximum actuation value in the step of determining a motor actuation signal to be outputted to the electric motor of the appliance; and
a first pulse mode with a first pulse form of the actuation signal for actuating the electric motor, the motor actuation signal to be outputted to the motor being determined on the basis of the second control signal and the first pulse form in the step of determining a motor actuation signal to be outputted to the electric motor of the appliance.

8. The method according to claim 7,
wherein the first and second maximum actuation values are selected from the group consisting of a maximum voltage to be applied, a maximum rotation speed and a maximum torque of the motor.

9. The method according to claim 7, wherein a control unit for controlling the electric motor of the appliance selects the first pulse mode, and performs at least one of the following functions:
controlling a pulse width dependently upon an operation path of the second operation element;
switching between an off state and actuation with the first pulse form according to the actuation of the second operation element;
controlling an amplitude of the first pulse form dependently upon an actuation path of the second operation element;
controlling a frequency of the first pulse form dependently upon the operation path of the second operation element;
controlling a pulse ratio, and on/off, of the first pulse form dependently upon the operation path of the second operation element; and
controlling a combination thereof according to the operation path of the second operation element.

10. The method according to claim 7, wherein the first pulse form of the first pulse mode is selected from the group consisting of:
a sawtooth pulse;
a sinusoidal pulse;
a rectangular pulse;
a trapezoidal pulse; and
any pulse form.

11. The method according to claim 7, wherein
in the first and the second motor actuation mode, a correlation exists between the second control signal and a course between a minimum value and the first or second maximum value, wherein the correlation is selected from the group consisting of:
a linear correlation;
an exponential correlation;
a step-like correlation; and
any curved correlation.

12. The method according to claim 7, further comprising the step:
measuring, by a measuring device, a rotation speed of the motor, wherein
in the step of determining a motor actuation signal to be outputted to the electric motor of the appliance, the motor actuation signal to be outputted to the electric motor is further determined on the basis of the measured rotation speed of the electric motor.

* * * * *